(12) United States Patent
Wang et al.

(10) Patent No.: US 8,599,160 B2
(45) Date of Patent: Dec. 3, 2013

(54) EXTERNAL TOUCH KEYBOARD

(75) Inventors: Yao-Liang Wang, Shenzhen (CN);
Lin-Yi Wang, Shenzhen (CN);
Chun-Jen Lin, New Taipei (TW);
Mi-Chien Chen, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 210 days.

(21) Appl. No.: 13/290,131

(22) Filed: Nov. 7, 2011

(65) Prior Publication Data

US 2012/0268395 A1 Oct. 25, 2012

(30) Foreign Application Priority Data

Apr. 25, 2011 (CN) .......................... 2011 1 0103500

(51) Int. Cl.
*G06F 3/041* (2006.01)

(52) U.S. Cl.
USPC ........................................ 345/173

(58) Field of Classification Search
USPC .......... 345/173, 174, 175, 156, 158, 104, 161
See application file for complete search history.

(56) References Cited

U.S. PATENT DOCUMENTS

| | | | | |
|---|---|---|---|---|
| 5,205,637 | A * | 4/1993 | Caspari .......................... | 362/109 |
| 6,222,525 | B1 * | 4/2001 | Armstrong ...................... | 345/161 |
| 8,183,518 | B2 * | 5/2012 | Ahn et al. ....................... | 250/221 |
| 2006/0209022 | A1 * | 9/2006 | Hosoda .......................... | 345/156 |
| 2009/0143110 | A1 * | 6/2009 | Armstrong ...................... | 455/566 |
| 2010/0117987 | A1 * | 5/2010 | Lin et al. ........................ | 345/174 |
| 2011/0241989 | A1 * | 10/2011 | Park et al. ...................... | 345/158 |
| 2011/0273403 | A1 * | 11/2011 | Hung et al. .................... | 345/175 |

* cited by examiner

*Primary Examiner* — Fred Tzeng
(74) *Attorney, Agent, or Firm* — Altis & Wispro Law Group, Inc.

(57) ABSTRACT

A touch keyboard includes a touch panel, a light guide plate, a keyboard layer, and a controller. The controller is connected to the touch panel. When a user touches the touch panel, the controller determines the touch position by detecting changes in the current of the touch panel, and generates a command signal. The keyboard layer is sandwiched between the touch panel and the light guide plate. The keyboard layer includes a film and a plurality of keyboard signs printed on the film, and the positions of the keyboard signs are recorded in the controller.

18 Claims, 7 Drawing Sheets

EXTERNAL TOUCH KEYBOARD

BACKGROUND

1. Technical Field

The present disclosure generally relates to a keyboard, and particularly, to an external touch keyboard.

2. Description of the Related Art

Touch screens are widely used in electronic devices, such as mobile phones and tablet computers. In use, a user only needs to touch the screen to bring up a virtual keyboard, and enter information simply by touching the virtual keyboard. However, the virtual keyboard takes up a large area of the touch panel. Thus, it is inconvenient to use.

To solve the above-described problem, an external touch keyboard is equipped with the electronic device. The external touch keyboard includes a drive circuit, a conversion circuit, and an organic light-emitting diode (OLED) display. The conversion circuit can switch the external touch keyboard from a virtual keyboard mode to a handwriting mode. The drive circuit drives the OLED display in the virtual keyboard or the handwriting mode according to a control signal of the conversion circuit. However, the external touch keyboard generally has a relatively complex structure and a high manufacturing cost. Furthermore, the OLED display has high power consumption.

Therefore, there is room for improvement within the art.

SUMMARY

A touch keyboard includes a touch panel, a light guide plate, a keyboard layer, and a controller. The controller is connected to the touch panel. When a user touches the touch panel, the controller determines the touch position by detecting changes in the current of the touch panel, and generates a command signal. The keyboard layer is sandwiched between the touch panel and the light guide plate. The keyboard layer includes a film and a plurality of keyboard signs printed on the film, and the positions of the keyboard signs are recorded in the controller.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
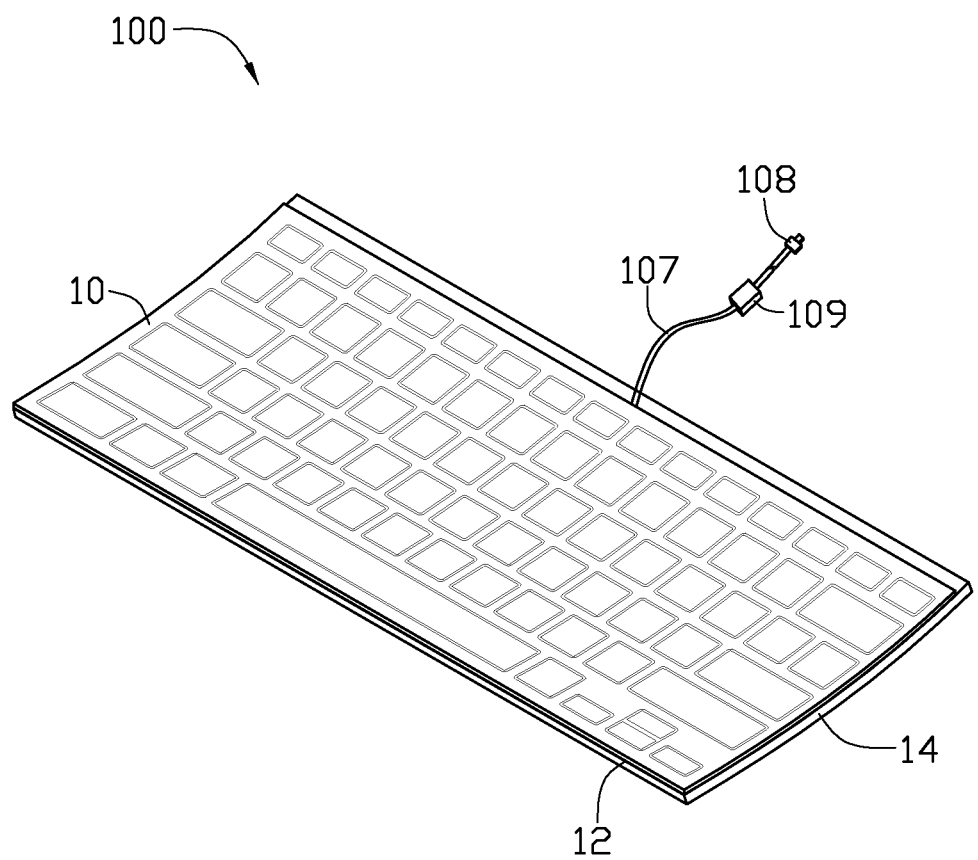
FIG. 1 is an isometric view of a first embodiment of a touch keyboard including a touch panel, a keyboard layer, and a light guide plate.
Figure 2:
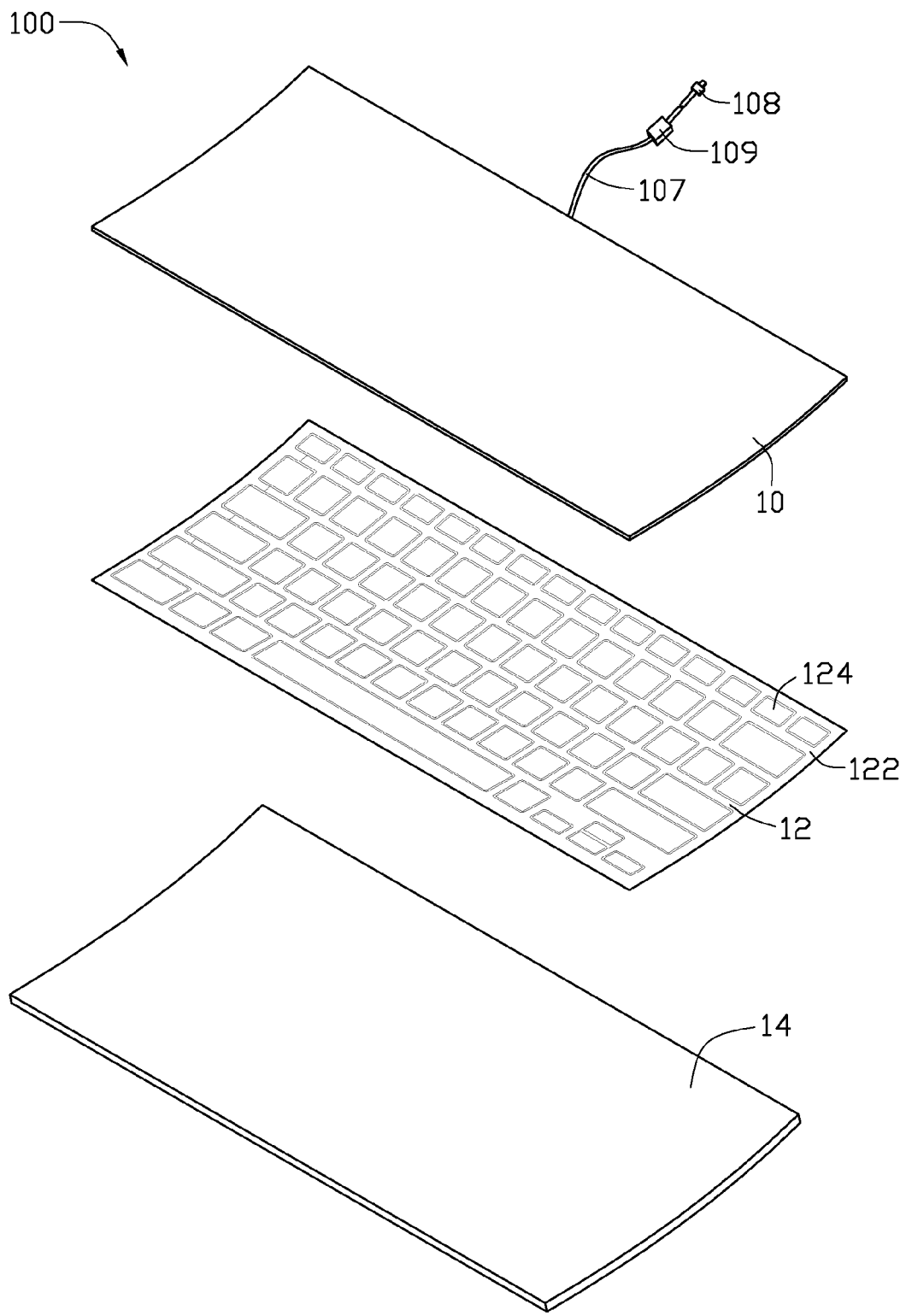
FIG. 2 is an exploded, isometric view of the touch keyboard of FIG. 1.

Referring to FIGS. 1 and 2, a first embodiment of a touch keyboard 100 includes a touch panel 10, a keyboard layer 12, and a light guide plate 14. The keyboard layer 12 is sandwiched between the touch panel 10 and the light guide plate 14.

Figure 3:
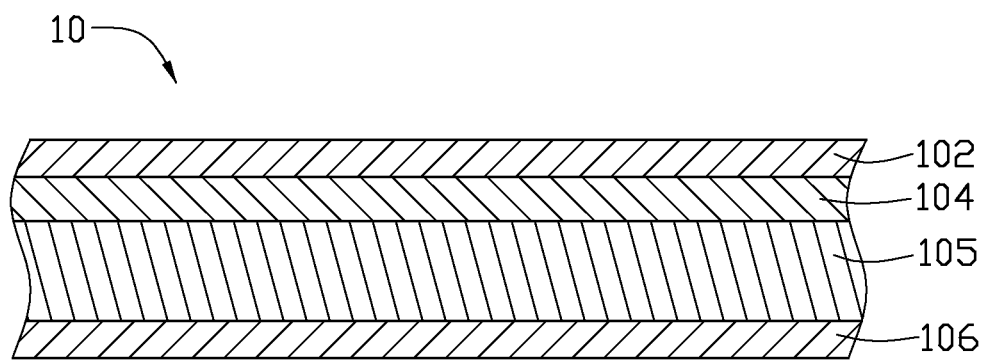
FIG. 3 is a partial, cross-section view of the touch panel of FIG. 1.

Referring to FIG. 3, the touch panel 10 is a transparent capacitive touch panel in this embodiment, and includes a protective layer 102, a first conductive layer 104, a main body 105, and a second conductive layer 106, arranged in that order and adhered to each other. In the illustrate embodiment, the protective layer 102 is made of silicon dioxide or polyethylene terephthalate (PET). The first conductive layer 104 is made of indium tin oxide, aluminum doped zinc oxide (ZAO), cadmiumoxide (CdO), or other transparent conductive materials. The first conductive layer 104 is configured for detecting a touch point of a user. The main body 105 is a glass plate or a transparent plastic plate. The second conductive layer 106 is made of transparent conductive materials, and can be used as a shielding layer.

The touch keyboard 100 further includes a keyboard cable 107 connected to the touch panel 10, a signal transmission interface 108, and a controller 109 connected to the keyboard cable 107. The signal transmission interface 108 can be a plug-in USB interface 108 capable of connecting to an electronic device (not shown). The controller 109 is also connected to the first conductive layer 104 and the second conductive layer 106 via flexible cables (not shown). When the user touches the protective layer 102 with fingers or other objects, the controller 109 determines the touch position by detecting changes in the current of the first conductive layer 104, and generates a corresponding command signal transmitted to the electronic device. The touch panel 10 may also be a resistive touch panel, a surface acoustic wave touch panel, or an optical touch panel. The touch keyboard 100 can be a wireless keyboard, and the signal transmission interface 108 and a controller 109 are directly positioned on a side of the touch panel 10. Furthermore, the signal transmission interface 108 and a controller 109 may be integrated together.

The keyboard layer 12 is attached to the second conductive layer 106 of the touch panel 10, and includes a film 122 and a plurality of keyboard signs 124 printed on the film 122. The film 122 may be made of PET or polyamide (PA). The keyboard signs 124 can be made from light-sensitive ink. The keyboard layer 12 is a transparent layer, so that the keyboard signs 124 can be displayed on the film 122 when light is emitted on the film 122. The positions of the keyboard signs 124 are stored in the controller 109. The film 122 may be a colorful film so that the touch keyboard 100 can have an appealing appearance. Correspondingly, the keyboard signs 124 may also be colorful. In addition, the keyboard layer 12 may also be a transparent layer directly printed on the touch panel 10 or the light guide plate 14.

The light guide plate 14 diffuses point light sources (not shown) to a surface light source, thus evenly illuminating the keyboard layer 12 and the touch panel 10.

When the touch keyboard 100 is not powered, the keyboard signs 124 will not be displayed on the touch keyboard 100, and the whole touch keyboard 100 is transparent. When the touch keyboard 100 is powered, light will emit onto the keyboard layer 12 and through the light guide plate 14, so that the keyboard signs 124 can be displayed on the touch keyboard 100. The user can touch the touch panel 10 according to the keyboard signs 124. Simultaneously, the controller 109 determines the touch position of the user, and transmits the command signal to the electronic device via the signal transmission interface. The shape of the keyboard signs 124 can be designed to meet the demands of the user.

The touch keyboard 100 is a simple structure that can be connected to the electronic device for inputting information.

The keyboard layer 12 can be made of the light-sensitive ink, reducing manufacturing cost of the touch keyboard 100. In addition, the touch keyboard 100 can be designed to be a transparent plate or colorized plate, and can be used in light or dark environments.

Figure 4:
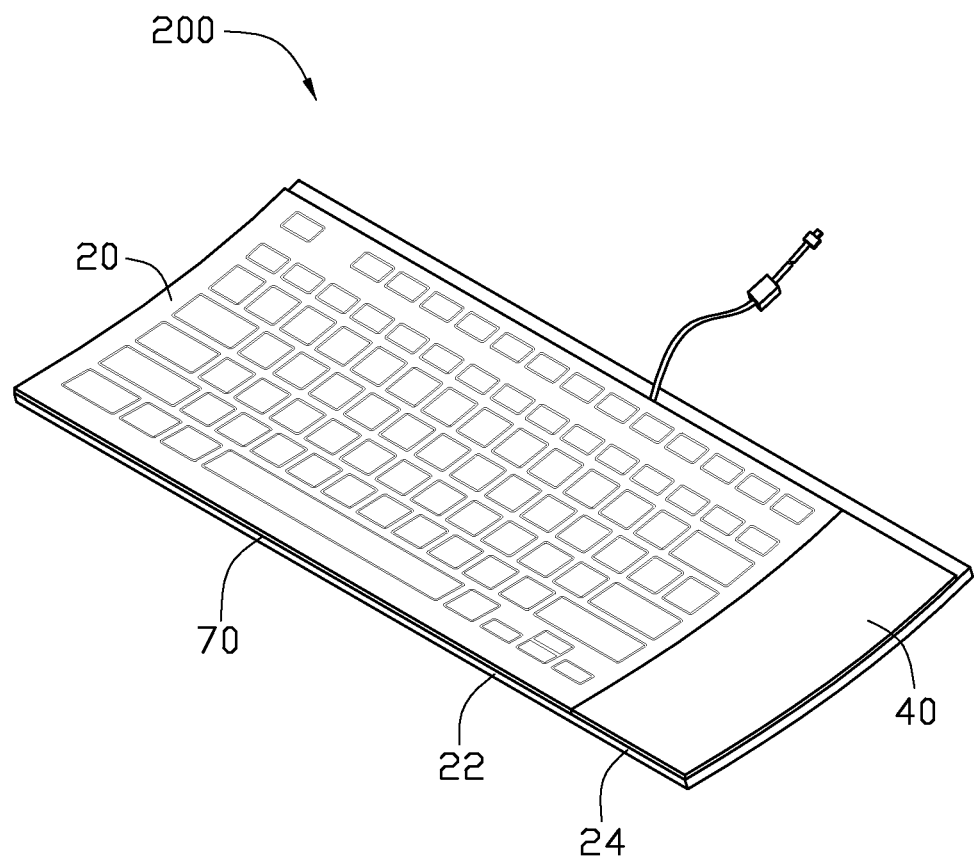
FIG. 4 is an isometric view of a second embodiment of a touch keyboard.
Figure 5:
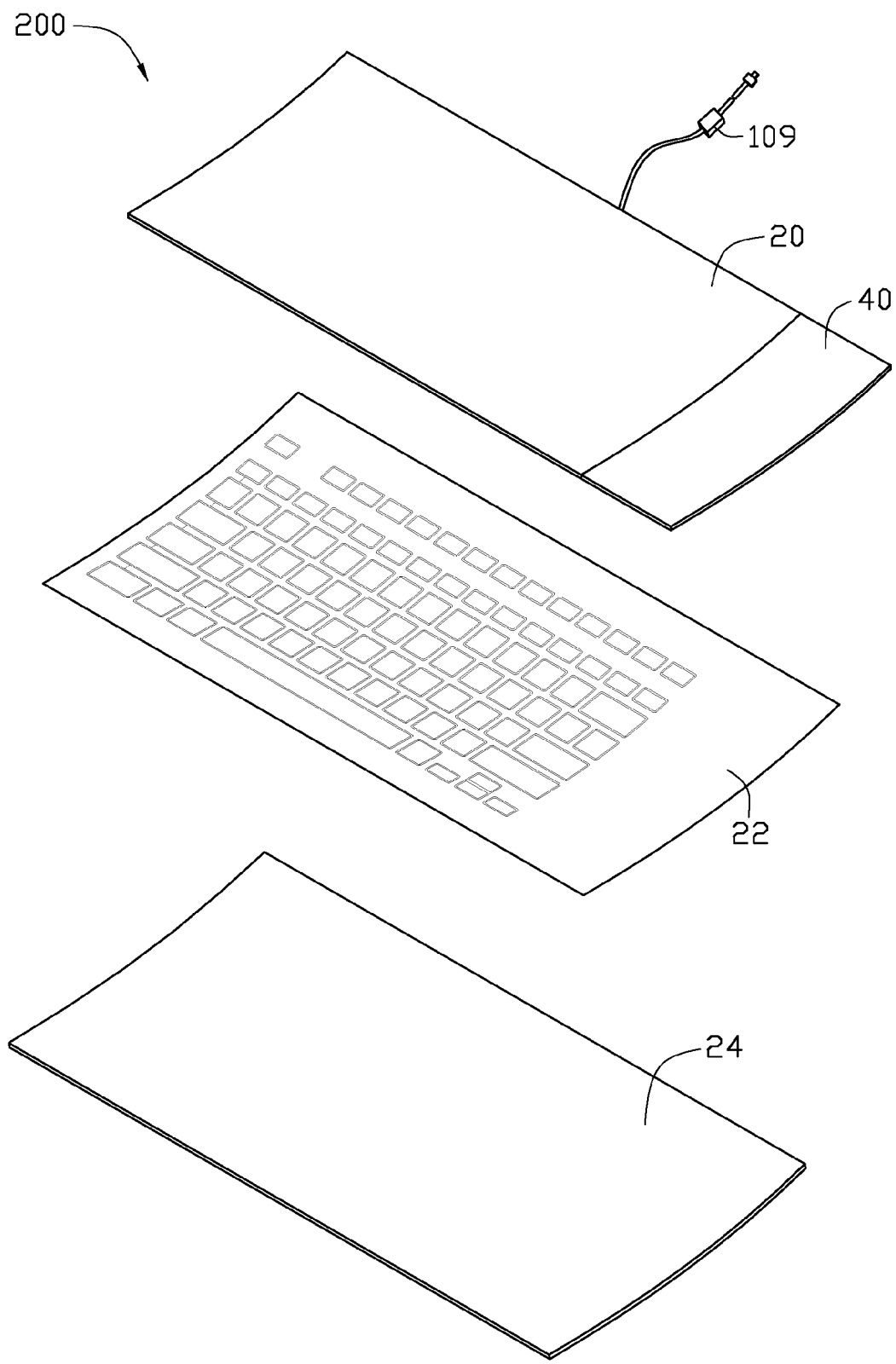
FIG. 5 is an exploded, isometric view of the touch keyboard of FIG. 4.

Referring to FIGS. 4 and 5, a second embodiment of a touch keyboard 200 includes a touch panel 20, a keyboard layer 22, a tablet 40, and a light guide plate 14. The tablet 40 is arranged side by side with the touch panel 20. The touch panel 20 is sandwiched between the touch panel 20 and the light guide plate 14. The tablet 40 is made of transparent materials, and adhered to the touch panel 20. The tablet 40 may be connected to the controller 209 via flexible cables, to transmit input information of the tablet 40 to the electronic device via the controller 209.

Figure 6:
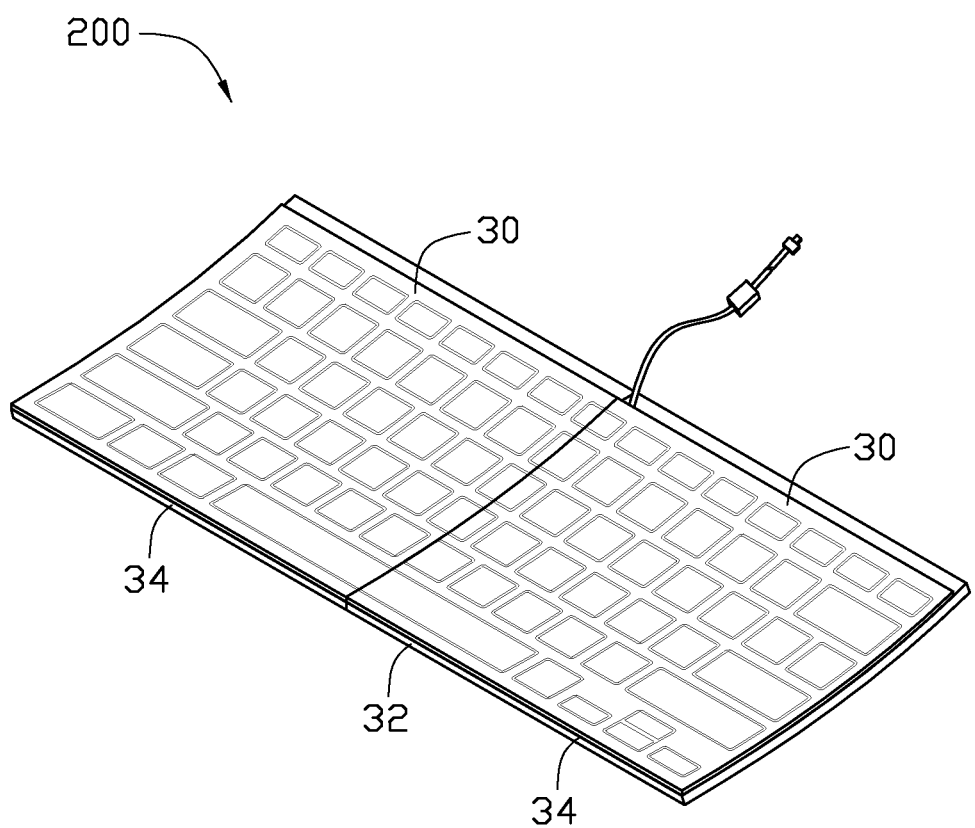
FIG. 6 is an isometric view of a third embodiment of a touch keyboard.
Figure 7:
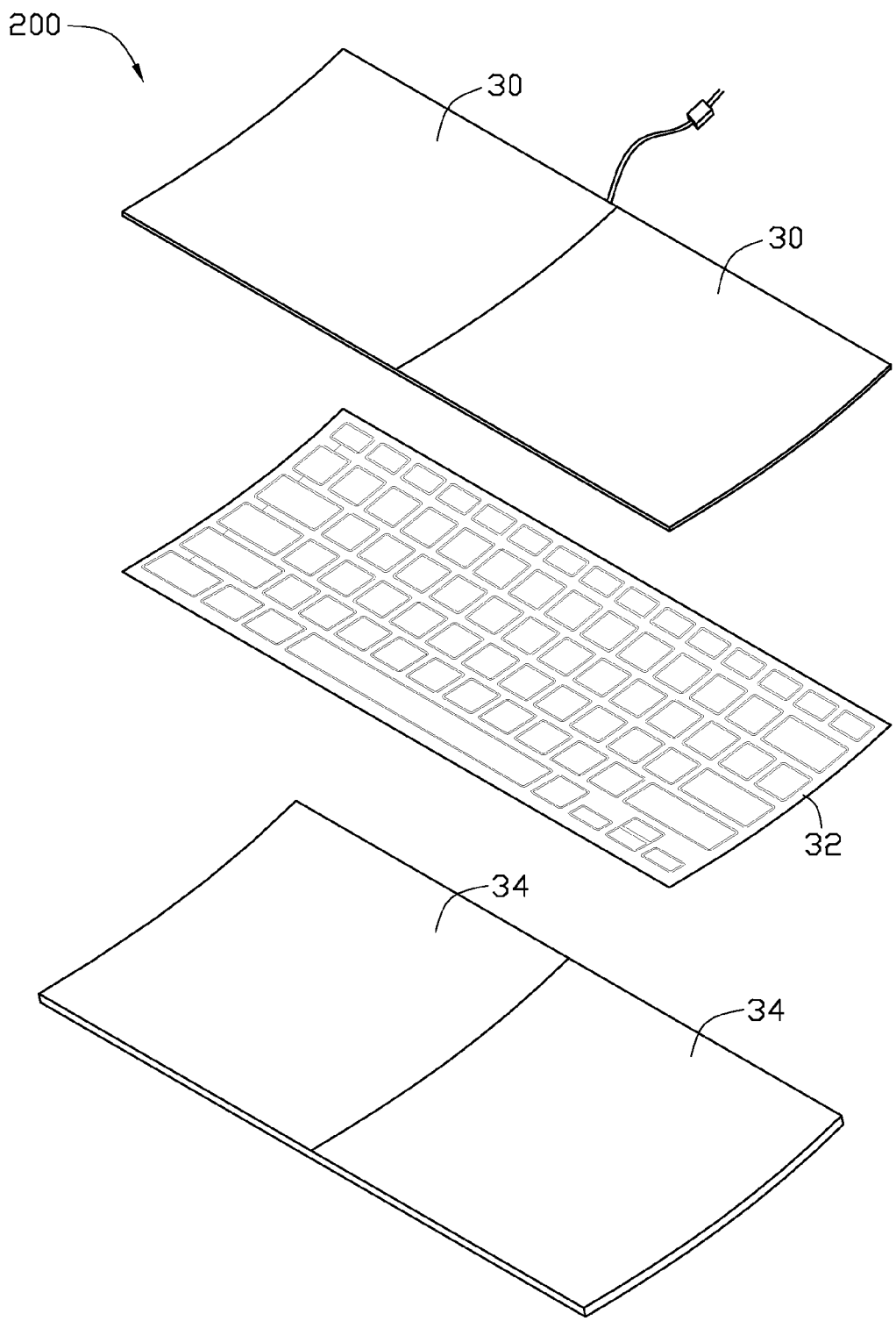
FIG. 7 is an exploded, isometric view of the touch keyboard of FIG. 6.

Referring to FIGS. 6 and 7, a third embodiment of a touch keyboard 300 includes two touch panels 30 electrically connected with each other via flexible cables, a keyboard layer 32, and two light guide plates 34 optically coupled with each other. The keyboard layer 32 is sandwiched between the touch panels 30 and the light guide plates 34. Therefore, the touch keyboard 300 can be folded with one light guide plate 34 stacked on the other light guide plate 34, thereby reducing the size of the touch keyboard 300. The touch keyboard 300 may include three or more touch panels 30 electrically connected with each other via flexible cables, and three or more light guide plates 34 optically coupled with each other, thus allowing the touch keyboard 300 to be folded into a smaller size.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims

What is claimed is:

1. A touch keyboard, comprising:
    a touch panel;
    a controller connected to the touch panel, wherein when a user touches the touch panel, the controller determines the touch position by detecting changes in the current of the touch panel, and generates a command signal;
    a light guide plate; and
    a keyboard layer sandwiched between the touch panel and the light guide plate.

2. The touch keyboard of claim 1, wherein the keyboard layer comprises a film and a plurality of keyboard signs printed on the film.

3. The touch keyboard of claim 2, wherein the keyboard signs are made from light-sensitive ink.

4. The touch keyboard of claim 2, wherein positions of the keyboard signs are recorded in the controller.

5. The touch keyboard of claim 1, wherein the keyboard layer is a transparent layer directly printed on the touch panel or the light guide plate.

6. The touch keyboard of claim 1, further comprising a signal transmission interface connected to the controller, wherein the controller transmits the command signal to the signal transmission interface.

7. The touch keyboard of claim 1, further comprising a tablet connected to the controller and adhered to the touch panel side by side.

8. The touch keyboard of claim 1, wherein the touch panel comprises a protective layer, a first conductive layer, a main body, and a second conductive layer, arranged on top of each other in that order and adhered to each other.

9. The touch keyboard of claim 8, wherein the first conductive layer and the second conductive layer are made of transparent materials.

10. A touch keyboard, comprising:
    at least two touch panels electrically connected to each other;
    a controller connected to the at least two touch panels, wherein when a user touches the at least two touch panels, the controller determines the touch position by detecting changes in the current of at least two touch panels, and generates a command signal;
    at least two light guide plates optically coupled to each other; and
    a keyboard layer sandwiched between the at least two touch panels and the at least two light guide plates.

11. The touch keyboard of claim 10, wherein the keyboard layer comprises a film and a plurality of keyboard signs printed on the film.

12. The touch keyboard of claim 11, wherein the keyboard signs are made from light-sensitive ink.

13. The touch keyboard of claim 11, wherein the positions of the keyboard signs are recorded in the controller.

14. The touch keyboard of claim 10, wherein the keyboard layer is a transparent layer directly printed on the touch panel or the light guide plate.

15. The touch keyboard of claim 10, further comprising a signal transmission interface connected to the controller, wherein the controller transmits the command signal to the signal transmission interface.

16. The touch keyboard of claim 10, further comprising a tablet connected to the controller and adhered to the touch panel side by side.

17. The touch keyboard of claim 10, wherein the touch panel comprises a protective layer, a first conductive layer, a main body, and a second conductive layer, arranged on top of each other in that order and adhered to each other.

18. The touch keyboard of claim 17, wherein the first conductive layer and the second conductive layer are made of transparent materials.

* * * * *